United States Patent [19]

Rowe

[11] 4,396,665
[45] Aug. 2, 1983

[54] SELF-ADHESIVE ROOFING LAMINATES HAVING METAL LAYER THEREIN

[75] Inventor: Paul E. Rowe, Lexington, Mass.

[73] Assignee: W. R. Grace & Co., Cambridge, Mass.

[21] Appl. No.: 159,753

[22] Filed: Jun. 16, 1980

[51] Int. Cl.$^3$ .................... B32B 3/02; B32B 5/14; B32B 7/02; B32B 11/08
[52] U.S. Cl. .................... 428/148; 52/415; 52/416; 428/193; 428/213; 428/214; 428/215; 428/220; 428/332; 428/339; 428/489; 428/906; 428/910; 428/212; 428/468
[58] Field of Search .............. 428/489, 40, 468, 921, 428/212, 910, 141, 148, 906, 193, 220; 52/420, 419, 173 R, 516, 409, 416, 408, 540, 309.3, 309.13, 309.14, 309.15, 309.17, 573; 156/71; 264/31, 230

[56] References Cited

U.S. PATENT DOCUMENTS

| | | | |
|---|---|---|---|
| 1,819,270 | 8/1931 | Shakespeare | 52/420 |
| 3,247,636 | 4/1966 | Mick et al. | 52/309.13 |
| 3,280,528 | 10/1966 | Dunlap | 52/309.13 |
| 3,290,206 | 12/1966 | Johnson et al. | |
| 3,300,927 | 1/1967 | Bettoli | 52/309.13 |
| 3,305,509 | 2/1967 | Waterman et al. | 260/29.7 |
| 3,328,232 | 6/1967 | Dunn et al. | 52/309.13 |
| 3,369,959 | 2/1968 | Noyes | |
| 3,399,091 | 8/1968 | Comay et al. | 156/71 |
| 3,409,498 | 11/1968 | Suter | |
| 3,415,712 | 12/1968 | Barker, Jr. | 428/212 |
| 3,483,664 | 12/1969 | Funk et al. | 52/309.13 |
| 3,547,772 | 12/1970 | Schnekler et al. | |
| 3,581,631 | 6/1971 | Samson | |
| 3,581,779 | 6/1971 | Sylvia, Jr. | 52/309.13 |
| 3,619,314 | 11/1971 | Ecureaux | 156/71 |
| 3,836,425 | 4/1974 | Whitney, Jr. | |
| 3,900,102 | 8/1975 | Hurst | 428/40 |
| 3,932,143 | 1/1976 | Marshall et al. | 428/921 |
| 4,096,304 | 5/1977 | Greengrass | 428/333 |
| 4,115,617 | 9/1978 | Mitsuishi et al. | 428/336 |
| 4,170,675 | 10/1979 | Greengrass | 428/109 |
| 4,235,058 | 11/1980 | Patry | 52/408 |

FOREIGN PATENT DOCUMENTS

| | | |
|---|---|---|
| 823193 | 9/1969 | Canada . |
| 1008738 | 3/1977 | Canada . |
| 2840599 | 3/1980 | Fed. Rep. of Germany . |
| 2341020 | 2/1976 | France . |
| 43-15996 | 11/1968 | Japan . |
| 1230756 | 5/1971 | United Kingdom . |
| 1332441 | 10/1973 | United Kingdom . |
| 1400385 | 7/1975 | United Kingdom . |
| 1548394 | 7/1979 | United Kingdom . |

OTHER PUBLICATIONS

Koppers Roofing and Waterproofing Membrane, Koppers Company, Inc., 1976.
Fire Protection Handbook, 12th Ed., (1962), pp. 8–76 to 8–85.

Primary Examiner—Stanley S. Silverman
Attorney, Agent, or Firm—William L. Baker

[57] ABSTRACT

Improved flexible waterproofing membranes of the pre-formed pressure-sensitive or self-adhesive bituminous type particularly useful in roofing are described. The membranes are in the form of factory-manufactured, flexible, sheet-like laminates employing a comparatively thin layer of metal film or foil positioned (a) beneath a support layer of synthetic polymer film and (b) above a layer of waterproofing self-adhesive bituminous composition such as rubberized asphalt. The metal film imparts a number of desired properties to the laminate such as fire-resistance, handling, etc. The upper polymeric support film protects the metal film and provides, inter alia, strength, puncture-resistance, and additional waterproofing properties. In one preferred embodiment, the upper polymeric film layer is a film having good weatherability characteristics. The upper polymer film may also desirably be a film having a higher linear thermal expansion coefficient than the underlying metal film layer in order that the edges of the applied laminate when exposed to e.g. solar heating and subsequent cooling turn downwards towards the substrate to be waterproofed resulting in improved sealability. Additionally, further layers of e.g. protective films and coatings may be applied to the laminates.

13 Claims, 4 Drawing Figures

SELF-ADHESIVE ROOFING LAMINATES HAVING METAL LAYER THEREIN

BACKGROUND OF THE INVENTION

This invention relates to laminates containing bituminous waterproofing layers adapted for waterproofing and sealing structures. More particularly, this invention relates to improve pre-formed flexible sheet like laminates of the pressure-sensitive or "self-adhesive" type for use in roofing applications as waterproofing membranes, which laminates employ layers of bituminous waterproofing compositions combined with metallic and polymeric film layers.

Flexible sheet-like laminates of support films and self-adhesive bituminous waterproofing layers preformed in the factory have been successfully employed in roofing applications as substitutes for the more conventional waterproofing membranes which are constructed at the job site by plying together one or more layers of bitumen-saturated paper or felt and bituminous adhesives. The pre-formed, self-adhesive laminate-membranes offer many advantages including factory controlled preparation, avoidance of heating equipment and handling of hot materials at the job site, as well as many performance advantages.

Flexible pre-formed laminates of the aforementioned type and their use to form waterproofing layers in various kinds of building structures are described for example in U.S. Pat. Nos. 3,741,856; 3,583,682 and 3,900,102 to John Hurst. Such patents describe in particular the preparation of flexible laminates containing a support material, for example a layer of a polymeric or metallic film, and a layer of self-adhesive, or pressure-sensitive adhesive, bitumen-elastomer waterproofing composition. As discussed in particular in U.S. Pat. No. 3,900,102, such laminates may ideally be constructed in the plant in the form of a roll with a protective sheet, for example siliconized paper applied against the self-adhesive bituminous waterproofing layer, transported to the job site, and thereafter applied to a substrate adhesive side down, each successive laminate strip being made to overlap the edge of the previously-applied strip of laminate to insure a continuous waterproofing seal.

In Canadian Pat. No. 1,008,738 to Everett R. Davis, improved waterproofing laminates of the type described in the aforementioned U.S. patents are described which utilize as the support material for such laminates, cross-laminated or biaxially oriented polymeric films. As discussed in the Canadian patent, such support films were found to provide laminates which exhibit reduced wrinkling following adhesion to a substrate and subsequent exposure to heat, for example, exposure to the sun. In recent years, flexible preformed laminates utilizing cross-laminated high density polyethylene films as the support layers for self-adhesive waterproofing layers of asphalt-rubber composition have been successfully applied in the form of overlapping strips to the rooftops of a variety of types of buildings to form long-lasting protective membranes against the passage of water and moisture. Protective coatings containing for example inert aggregates, pigments, metal flakes, etc., have been applied to the exposed surfaces of the overlapped laminates which significantly increase the life of the waterproofing laminate-membrane. However, there is a continuing need in the art for improved flexible laminates for use as waterproofing membranes for roofs of buildings and the like.

BRIEF SUMMARY OF THE INVENTION

The present invention concerns improved preformed laminates having particular utility in constructing waterproofing layers upon roofs of buildings and the like, and to such roofs having such layers. The inventive laminates are constructed of a comparatively thin layer of metal film or foil arranged intermediate of (a) an upper and preferably thicker layer of a preformed synthetic polymer film and (b) a lower and preferably still thicker layer of waterproofing pressure-sensitive or self-adhesive bituminous composition, all of such layers being integrally bonded to one another. The laminates are preferably prepared with a further layer of protective material adjacent the adhesive layer which is easily removable from the adhesive layer without damage thereto prior to application of the laminate to the substrate to be waterproofed. The laminates may additionally have protective coatings and/or films applied to the upper polymericfilm layer before or after installation upon the substrate to be waterproofed.

DETAILED DESCRIPTION OF THE INVENTION

Figure 1:
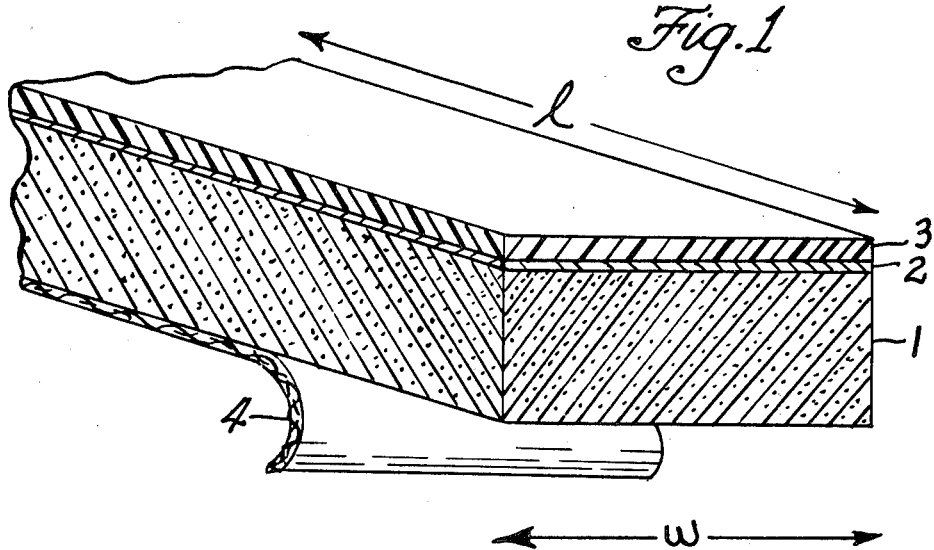
FIG. 1 is a perspective cross-sectional view of a roofing laminate according to the invention.

In the attached FIG. 1, the inventive roofing laminate is shown as comprised of a comparatively thick layer of self-adhesive bituminous water proofing composition 1, adhered to a comparatively thin layer of metal foil 2, which in turn is adhered to an upper surface layer 3 of synthetic polymer film having a thickness greater than that of the metal foil 2, but less than that of the bituminous composition 1. The layers 1, 2 and 3 are well-bonded to one another, that is, are not separable from one another normally without physical damage resulting to one or more of the layers. While not shown in the drawing, layers 2 and 3 are adhered to one another by a thin layer of adhesive the sole function of which is to adhere the two layers together. The self-adhesive bituminous waterproofing layer 1 will normally have sufficient adhesive properties that additional adhesive to bond it thoroughly to the metallic foil layer 2 will not be necessary. To protect the surface of the bituminous adhesive layer remote from foil 2, a removable protective sheet 4, of, e.g. siliconized paper, is applied thereto. The sheet 4 adheres sufficiently to the bituminous adhesive to keep it in place during handling of the laminate, but is easily removable therefrom without physical damage to the layer 1.

The roofing laminate shown in FIG. 1 has a width ("W"), e.g. 36 inches, less than its length ("1"), e.g. 60 feet, and can conveniently be packaged in the form of a roll which is simply unrolled at the job site, thereafter the protective sheet 4 removed and the exposed surface of the bituminous adhesive layer 1 placed adjacent the substrate 5 (FIGS. 2, 3, and 4) to be waterproofed. Another like strip of waterproofing laminate (FIG. 3) is then placed adjacent to the laminate, care being taken to overlap the edges of each laminate a short distance in the manner shown for example in FIGS. 3 and 4 of U.S. Pat. No. 3,900,102 to Hurst. An additional continuous protective coating 6 in FIG. 4, may then be applied to the exposed surfaces of the overlapped laminates.

The self-adhesive or pressure-sensitive bituminous waterproofing layer 1 useful herein is preferably of the type described in the aforementioned patents. The adhesive composition comprises a mixture of (a) a bituminous material and (b) natural or synthetic polymer preferably a rubber or other elastomer polymer. The amount of polymer employed in such compositions is typically from about 1 to 100, preferably about 20 to 50, percent by weight of the bituminous material. The term "bituminous material" as used herein includes compositions containing asphalt, tar such as coal tar, or pitch. The bituminous adhesive may be reinforced with fibers and/or particulate fillers. The adhesive composition may also contain a conventional extender component such as mineral oil. Suitable polymers include thermoplastic polymers such as polyethylene and the like. As aforementioned, the preferred polymer component is rubber whch may be a virgin rubber or reclaimed rubber which is blended into the bitumen and preferably an extender oil component preferably at elevated temperature to form a smooth mix. Generally, suitable adhesive compositions have softening points (measured by the Ring and Ball method) of 70° to 120° C., preferably 75° to 100° C., and penetration values of 50 to 400, preferably 50 to 100 dmm. at 25° C. (150 g/5-ASTM D217), and are thermoplastic in nature.

As mentioned in the aforementioned patents, in order to give optimum sealing and waterproofing performance the adhesive layer should be at least 0.010 inch thick and preferably in the range of about 0.025 to about 0.200 inch thick. The adhesive layer can be comprised of one or more layers of the aforementioned bituminous adhesive, not necessarily of the same composition, to give an adhesive layer within the overall aforementioned thickness range. Further, the adhesive layer can have a reinforcement such as an open weave fabric, gauze, scrim or the like located therein to strengthen it. The adhesive layer 1, at least at its surface remote from support sheet 3 is pressure-sensitive and tacky at normal ambient temperature in order that it be self-adhesive to the substrate. The bituminous adhesive layer serves to form a a continuous waterproofing covering which is elastic and self-sealing against punctures at high and low temperature.

The synthetic polymer layer 3 is comprised of a preformed film layer which has been bonded to the layer 2 of metal film or foil. The layer 3 of synthetic polymer film serves as a strength imparting and supporting member in the laminate and also as a barrier to prevent moisture vapor transmission through the laminate. Thus while of less thickness than that of the bituminous waterproofing layer 1, the film utilized for layer 3 should be of sufficient thickness to impart e.g. tear and puncture resistance to the laminate. The film layer 3 thus differs from, for example, comparatively thinner and weaker polymer coating compositions which have been applied in the past to the surfaces of laminates as liquid solutions or emulsions to impart color, oxidation resistance, protection against ultra-violet light, reflectance, etc. The polymeric film layer 3 suitably has a thickness in the range of from 0.002 to 0.025, preferably from about 0.004 to about 0.010 inches.

The preferred films for use in the layer 3 are films of synthetic organic polymers such as polyethylene, polypropylene or other polyolefin; polyamide, polyester, e.g. polyethylene terephthalate, polyurethane, polyvinyl chloride, a copolymer of vinyl chloride and vinylidiene chloride, synthetic rubber such as polychloroprene or butyl rubber, etc. It is desirable that the film 3 have optimum weatherability characteristics. The films may be rendered opaque, for example, by the incorporation therein of a material such as carbon black to render the film non-translucent. Protective coatings and films, for example, thin pigmented coatings and films, can be applied in the factory to the surfaces of the film 3 to be exposed to the weather. Moreover, the polymer film layer 3 may be a single sheet of pre-formed film, or may itself comprise a plurality of such layers, not necessarily identical, laminated together to form a unitary layer 3.

Cross-laminated polymeric films and biaxially-oriented polymeric films are desirable films for use in the layer 3. As discussed in the aforementioned Canadian patent, such films are more dimensionally stable when laminated to bituminous adhesive of the type employed herein, adhered to a roof substrate, and exposed to heat from e.g. the sun. Any film-forming synthetic polymer or copolymer which can be oriented (biaxially or cross-laminated) is useful. Biaxially oriented films of such polymers as polyolefins, e.g. high and low density polyethylene, vinyldiene chloride, polystyrene, polyvinyl chloride, rubber hydrochloride, polyethylene terephthalate, etc., are commercially available. Especially useful films are biaxially oriented polyolefin and cross-laminated polyolefins. Preferred polymeric films for use in the film layer 3 are cross-laminated high density polyethylene films and biaxially oriented polyesters such as polyethylene terephthalate, desirably containing a filler such as carbon black to render the film opaque.

The layer 2 of metal film or foil placed between the upper polymeric film 3 and lower bituminous waterproofing adhesive layer 1, is, as aforementioned preferably relatively thin in cross-section as compared to layers 1 and 2. The metal foil as employed in the laminates of the invention has a thickness ranging from about 0.00025 to about 0.004 inches (about 0.25 to about 4 mils), preferably about 0.00035 to about 0.002 inches (about 0.35 mils to about 2 mils). The perferred metal foil for use herein is aluminum, although films of other metals such as copper, zinc, etc. could be used.

The provision of the metal film layer between layers 1 and 2 in the laminates of the invention leads to a number of desirable results. For example, metal films have been placed upon the surface of roofs to increase protection against extraneous fire sources, discarded cigarettes, etc. However, at the surface of the roof, the metal film is exposed to the elements and to potentially damaging impact by workmen, equipment, and the like. Even in instances where protective polymeric coatings have been applied to the upper surface of such metal coverings exposure is likely as the comparatively thin polymer coating wears and/or is damaged by foot traffic and the like. In the inventive construction herein, the comparatively thick polymer film layer 3 provides excellent protection to the thinner metal layer against deterioration by weather, foot traffic, and the like.

It has been found that, surprisingly, the fire-resistant properties (as demonstrated by a "flame spread" test hereinafter described) exhibited by the inventive laminates having the metal film layer beneath the polymeric film layer appear to be nearly as good as a laminate construction wherein the metal layer is above the polymer film layer. The reason for this finding is not completely understood, although it is thought that the underlying metal film's high thermal conductivity helps to dissipate the heat from the heat source to a temperature below the ignition point of the synthetic polymer film. In addition, the gas-impervious metal film in the construction of the invention will still act to prevent potentially combustible gases in the bituminous adhesive layer 1 from being exposed to the heat (extraneous fire) source. The good fire-resistance properties of the roofing laminates of the invention can eliminate the necessity of conventional fire-protecting methods, for example, the placement of layers of non-combustible gravel, paving block, cement-asbestos tiles, etc., over the exposed surfaces of the applied laminates.

Separation of the polymeric film support 3 from the bituminous waterproofing adhesive layer 1 by the intermediate impervious metallic film is further desirable since it prevents oils present in the bituminous waterproofing composition from contacting the polymeric film 3. Contact of the oil and synthetic polymer film can adversely affect the film, for example, adversely affect the dimensional stability of the film after adherence to the roof substrate.

The metal film layer 2 also imparts handling characteristics to the laminate which are desirable for many applications. The laminates containing the metal film layer are flexible yet posses a "deadfold" property which is desirable in instances where portions of roof substrates which are not flat are to be waterproofed, for example corners or in roof flashing applications. The metal foil-containing laminates of the invention when folded for instance into a corner will maintain the detail and not spring back to the extent that a laminate not containing the metal foil film would in the same application.

Positioning the metal film layer 2 beneath the synthetic polymer film 1 further leads in many instances to a roofing laminate having a "built-in" edge sealing ability due to the relatively low linear thermal expansion coefficient of metallic films as compared to most synthetic polymer films. As disclosed in my copending application U.S. Ser. No. 159,759, now abandoned filed herewith, self-adhesive waterproofing laminates exhibiting a "built-in" edge sealing ability can be produced by adhering a relatively thick layer of self-adhesive, thermoplastic bituminous waterproofing material to an upper flexible support layer which is itself comprised of separately adhered layers of flexible sheet material, the layer adjacent the bituminous adhesive having a lower coefficient of linear thermal expansion than the layer remote from the adhesive. After adherence to the roof substrate of such laminates, the edges of the laminate will bend to curl downwardly towards the substrate in a "self-sealing" fashion after a period of time has elapsed. This is because in actual practice the adhered laminates are exposed to repeated periods of heating and cooling due to changes in atmospheric temperature. Since the upper flexible sheet layer in the support has a thermal expansion coefficient greater than the underlying sheet layer in the support and the two layers are intimately bonded to one another, the edges of the laminate tend to curl downwardly, effecting an enhanced waterproofing seal at its edges. This downward curl becomes irreversible because the thermoplastic bituminous adhesive retains the laminate in the downwardly curled position. As discussed in my aforementioned copending application, the sheet materials of differing linear thermal expansion coefficient employed in the support layer should be materials having (a) a substantially "lay-flat" appearance and (b) a relatively good thermal dimensional stability per se. By "substantially lay-flat appearance" is meant, that, when laid flat and non-adhered onto a flat, horizontal surface, the upper and lower surfaces of the sheet materials will be substantially parallel to such horizontal surface and exhibit substantially no curling upwardly or downwardly. By "good thermal dimensional stability" it is meant that the sheet materials when exposed to elevated temperature exhibit substantially no shrinkage or at least do not shrink to an extent which would interfere with the desired "self-sealing" effect of the laminate described above. Should one or both of the sheet materials employed in the support layer have, for example, a substantial degree of curl before application of adhesive layer 1, or shrink substantially when heated such "inherent" curl or shrinkability of the material could interfere with the aforedescribed desired "built-in" edge sealing ability of the laminate occasioned by the use of the layers of differing linear thermal expansion coefficient.

Figure 2:
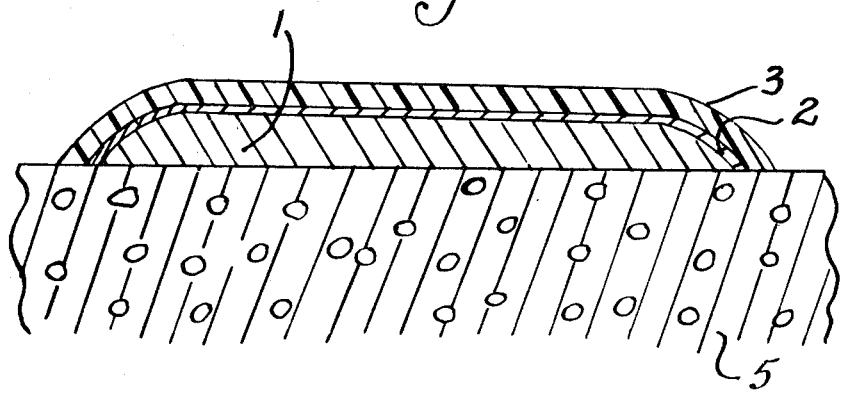
FIG. 2 is a cross-sectional view of a preferred laminate construction of the invention exhibiting a "built-in" edge sealing ability.
Figure 3:
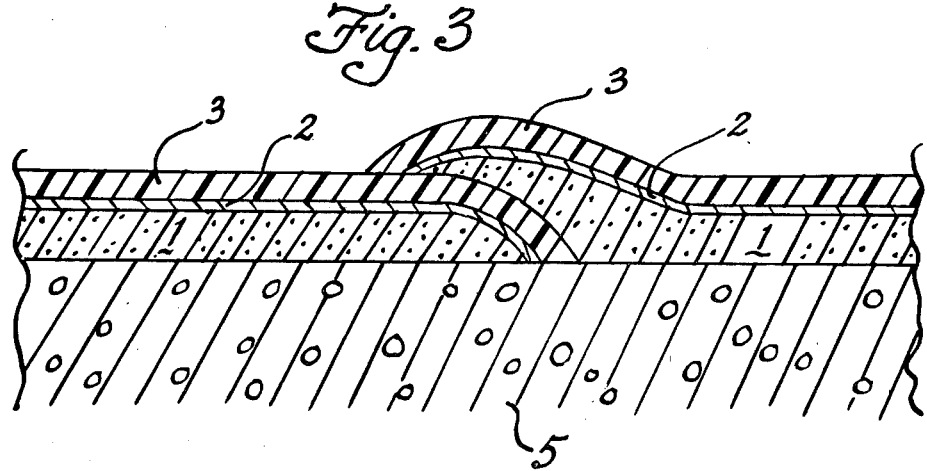
FIG. 3 is a view in cross-section of two overlapped laminates of the invention exhibiting a "built-in" edge sealing ability.

The laminates of this invention can be constructed to exhibit the above described "built-in" edge sealing ability after adhesion to a roof substrate by first adhering for example, a layer of high density polyethylene having substantially "lay flat" characteristics and good thermal stability as described above and the film layer 3 to a sheet of aluminum foil as the layer 2 (the resulting laminate of layers 2 and 3 exhibiting such "lay flat" and "dimensional stability" properties). To the exposed surface of aluminum layer 2 is thereafter applied adhesive 1. Since the polyethylene film has a linear thermal coefficient approximately 5 times as great as that of the aluminum film (Table I), the edges of the adhered laminate will bend or curl downwardly towards the adhesive layer as shown in FIG. 2, in a "self-sealing" fashion after exposure to fluctuation in atmospheric temperature. In FIG. 3, two such laminates applied to substrate 5 in overlapping fashion are shown after exposure to fluctuating temperature. Note that polymeric support film 3 curls downwardly towards the substrate and also protects the underlying layer of adhesive 1 from harmful exposure to the sun and elements.

The "built-in" downward edge-curling effect shown in FIGS. 2 and 3 can be promoted by adhering to the face of metal foil 2 remote from film 3 prior to application of adhesive 1 an additional layer (not shown) of a film of good dimensional stability as described above and of lesser thickness than film 3 and having a thermal expansion coefficient lower than film 3. Similarly, the degree of downward edge-curling shown in FIGS. 2 and 3 can be offset or controlled to a desired extent by using as such additional film first adhered to the face of metal 2 remote from film 3, a film having a linear thermal expansion coefficient greater than metal foil 2.

The desired self-sealing downward edge curl shown in FIGS. 2 and 3 is obtained by preferably employing as the upper film layer 3, polymeric films of good dimensional stability and having linear thermal expansion coefficients at least about twice as great as that of metal layer 2. Preferred synthetic polymer films 3 for use in achieving the desired "built-in" edge sealing properties of the laminates of the invention are those films ehich possess a linear thermal expansion coefficient greater than $30 \times 10^{-6}$ inch per inch per degree Fahrenheit (in/in/°F.). The linear thermal expansion coefficient of several films and foils are listed in Table I below.

TABLE I

| FILM (FOIL) | Approximate Linear Thermal Coefficient (in./in./°F. $\times 10^{-6}$) |
|---|---|
| Polyester | 10 |
| Aluminum | 12 |
| Polyvinyl Fluoride | 28 |
| Nylon (polyamide) | 55 |
| Polycarbonate | 36 |
| Polymethyl methacrylate | 39 |
| Polyethylene | 66 |

Figure 4:
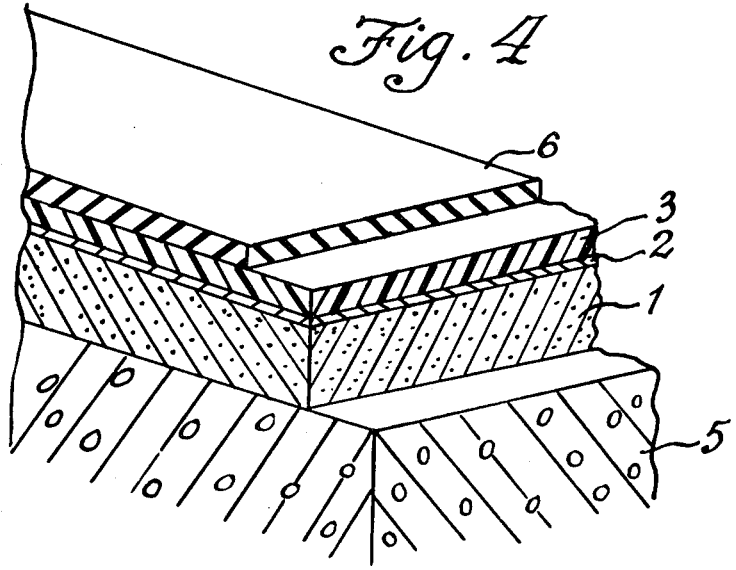
FIG. 4 is a perspective, cross-sectional view of a roof waterproofed according to the invention.

The "life" of waterproofing membrane layers formed using the waterproofing roofing laminates of the invention can be increased by the application of protective coatings, 6 in FIG. 4, thereover at the job site following installation of the laminates upon the roof substrate. Such "field-applied" coatings are now in conventional use in connection with waterproofing laminates of the type described in the aforementioned patents and have been found to add significantly to the endurance of the laminate-membranes. The coatings further protect the exposed synthetic polymer support films from harmful ultraviolet radiation and weather damage. Conventional "field-applied" coatings for this purpose are generally bitumen-, e.g. asphalt-, based compositions, containing plasticizers, fillers, antioxidants, pigments, etc. Reflective particles in such coatings, such as particles or flakes of metal such as aluminum, reduce the temperature of the laminate-membrane layer. The protective coatings are typically applied to the surfaces of the installed laminate-membrane layer in thickness of from about 0.002 to about 0.070 inches.

The invention is further illustrated by the following examples.

EXAMPLE I

Three sample laminates useful for waterproofing purposes were constructed and tested for fire-resistance properties and also for tendencies to curl at their edges after exposure to high and low temperatures. The construction of each laminate (NOS. 1 to 3) is shown in Table II.

TABLE II

| | Laminate Construction (LAYERS - TOP TO BOTTOM) | |
|---|---|---|
| NO. 1 | NO. 2 | NO. 3 |
| Protective Coating | Protective Coating | Protective Coating |
| Polymer Film "A" | Aluminum Foil | Polymer Film "A" |
| Waterproofing Adhesive | Polymer Film "A" | Aluminum Foil |
| | Waterproofing Adhesive | Polymer Film "B" |
| | | Waterproofing Adhesive |

The polymer film "A" used in the laminates of Table II was a cross-laminated, high-density polyethylene composite film (four, 2-mil thick, films pre-laminated together (having a total thickness of 0.008 inch (8 mils). The aluminum foil layer had a thickness of 0.35 mils. The waterproofing adhesive layer was 60 mils thick and comprised a self-adhesive, normally tacky mixture of asphalt, styrene-butadiene rubber and mineral oil. The waterproofing adhesive layer was applied to the laminates last. The polymer film "B" was a 1 mil thick layer of ionomer resin film. The protective coating applied to the top of each laminate comprised a 7 mil thick layer of a proprietary "fild-applied" coating composition containing asphalt, plasticizers, and aluminum flakes for heat reflectance.

Portions of each of the laminates of Table I measuring 12 inches by 12 inches were adhered, adhesive side down, to a substrate and subjected to a "flame spread" test to determine the rate of spread of a flame applied to the upper surfaces thereof while the laminates were maintained at an angle to the flame. The flame directed at the surface of laminate No. 1 spread 12 inches after 2 minutes had elapsed while the flame directed at the surfaces of laminates Nos. 2 and 3 spread 7.5 inches after 5 minutes had elapsed.

Portions of each of the sample laminates Nos. 1 to 3 measuring 3 inches by 6 inches were also again adhered to a substrate, adhesive side down, and the tendency of each to curl at its edge was observed at 70° F. after exposure to a temperature cycle ranging from 150° F. to minus 15° F. Laminate No. 1 exhibited no edge curl. The edges of laminate No. 2 curled upwardly away from the substrate, while the edges of laminate No. 3 curled downwardly towards the substrate in the manner of FIG. 2, ideally exhibiting a "built-in" edge sealing ability.

EXAMPLE II

Several rolls of a self-adhesive waterproofing laminate strip measuring 3 foot wide by 60 feet long and having a sixty mil-thick layer of waterproofing bituminous adhesive as in the laminates of Table II, were applied to the roof of a department store in Long Island in March of 1978. The rolls were sold to a commercial roofing installer who applied them to the roof as part of the flashing used in the roof. The laminate was similar in construction to that of sample No. 2 in Table II (the metal foil above the polymer film "A"), the differing being that in place of the 7 mils-thick protective coating used in Table II, a thin, protective coating of "Surlyn" brand ionomer resin ("Surlyn" is a trademark of Du-Pont de Nemours, E. I. & Co.) was factory applied to the surface of the aluminum foil remote from polymer film "A" to give it weather protection. Approximately one month later a visual observation made of the applied laminate strip showed the edges tending to curl upwardly away from the substrate.

While the inventive roofing laminate strip has been described in connection with its usage in the formation of a continuous waterproofing membrane upon a roof where for practical reasons a laminate having a width of at least about 36 inches is desired, strips having narrower dimensions can be utilized in other roofing applications. For instance, strips of the inventive laminate having a width of about 4 inches can be used to cover the joints between, e.g. insulation boards in roofs. Also, for, e.g., use as flashing strips in roofing applications, the laminate strips of the invention may have a width of, e.g. 12 inches.

It is claimed:

1. A waterproof roof construction comprised of a roof substrate and a continuous waterproofing layer adhered thereto, said waterproofing layer being comprised of a plurality of pre-formed, flexible pressure-sensitive adhesive strips each having a width of at least about 36 inches and a length greater than said width and being adhered to said substrate over its entire adhesive surface, said strips having been applied to said substrate in a fashion such that joints between adjacent strips are impervious to water in order that a continuous waterproofing layer is formed, said pre-formed adhesive strips being comprised of a layer of aluminum foil having a thickness of from about 0.35 mils to about 2 mils which is (a) positioned beneath and ahered to an upper support layer comprised essentially of synthetic polymer film and (b) positioned above and adhered to a lower layer of thermoplastic bituminous waterproofing, pressure-sensitive adhesive composition having a thickness of at least 10 mils, said adhesive layer of said strip laminates being placed adjacent said roof substrate; said synthetic polymer film in said support layer being comprised of a pre-formed polymer film having a thickness in the range of from about 4 to 10 mils and which has been bonded to said aluminum foil, the said thickness of said polymer film being such that tear and puncture resistance is imparted by said film to said laminate strip, said upper support layer comprised of said film further being rendered opaque in order that said layer possess optimum weatherability characteristics; said polymer film in said upper support layer having a coefficient of linear thermal expansion at least about twice as great as that of said aluminum foil layer; the edges of said laminate strips curling downward towards said roof substrate following application of said laminate strips to said roof substrate and exposure to elevated temperature, said edges being retained in said downwardly curled position due to said thermoplastic bituminous waterproofing adhesive layer.

2. The roof construction of claim 1 wherein said adhesive composition comprises a mixture of a polymer and bitumen.

3. The roof construction of claim 2 wherein said polymer is natural or synthetic rubber and said bitumen is asphalt.

4. The roof construction of claim 3 wherein said adhesive composition additionally contains mineral oil.

5. The roof construction of claim 1 wherein said laminate prior to utilization in said roof has a protective coating or film applied to the surface of said upper layer of polymer film remote from said metal film.

6. The roof construction of claim 5 wherein said protective coating or film is pigmented.

7. The roof construction of claim 6 wherein said pigment is carbon black.

8. The roof construction of claim 1 having a continuous protective coating over said waterproofing layer applied subsequent to the formation of said waterproofing layer on said roof.

9. The roof construction of claim 8 wherein said protective coating is a bitumen-containing composition.

10. The roof construction of claim 8 or 9 wherein said protective coating contains metal particles.

11. The roof construction of claim 1 wherein said upper support layer of polymer film is comprised of a cross-laminated polymeric film or a biaxially-oriented polymeric film.

12. The roof construction of claim 11 wherein said film is comprised of high density polyolefin.

13. The roof construction of claim 1 wherein said upper support layer of polymer film is a film having relatively good thermal dimensional stability and is adhered to said metal film to form a first laminate prior to lamination to said lower layer of adhesive composition, and the resulting said first laminate exhibits a substantially "lay-flat" appearance.

* * * * *